United States Patent
Babu et al.

(10) Patent No.: US 9,961,051 B2
(45) Date of Patent: May 1, 2018

(54) APPARATUS AND METHOD FOR PROCESSING SECURITY PACKET IN ELECTRONIC DEVICE

(71) Applicant: Samsung Electronics Co., Ltd., Suwon-si, Gyeonggi-do (KR)

(72) Inventors: Kamma Ganesh Babu, Suwon-si (KR); Jai-Dong Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days. days.

(21) Appl. No.: 14/539,295

(22) Filed: Nov. 12, 2014

(65) Prior Publication Data
US 2015/0135276 A1    May 14, 2015

(30) Foreign Application Priority Data

Nov. 12, 2013    (KR) .................. 10-2013-0137063

(51) Int. Cl.
*H04L 29/06*        (2006.01)

(52) U.S. Cl.
CPC ...... *H04L 63/0485* (2013.01); *H04L 63/0272* (2013.01); *H04L 63/164* (2013.01); *H04L 63/205* (2013.01); *H04L 65/1006* (2013.01)

(58) Field of Classification Search
CPC ............. H04L 63/0485; H04L 63/0272; H04L 63/164; H04L 63/205; H04L 63/1006
See application file for complete search history.

(56) References Cited

U.S. PATENT DOCUMENTS

| | | | | |
|---|---|---|---|---|
| 7,962,775 | B1 * | 6/2011 | Vaidyu | G06F 1/3203 713/322 |
| 2002/0041337 | A1 * | 4/2002 | Candelore | H04N 7/1675 348/591 |
| 2005/0138366 | A1 | 6/2005 | Loh et al. | |
| 2005/0182970 | A1 * | 8/2005 | Yasaki | G06F 21/56 726/5 |
| 2005/0232261 | A1 | 10/2005 | Wybenga et al. | |
| 2008/0178289 | A1 | 7/2008 | Gearhart et al. | |
| 2010/0180114 | A1 | 7/2010 | Bolton et al. | |
| 2010/0220727 | A1 | 9/2010 | Zuk et al. | |
| 2010/0287227 | A1 * | 11/2010 | Goel | H04L 67/1002 709/202 |
| 2010/0325420 | A1 * | 12/2010 | Kanekar | H04L 63/0823 713/151 |
| 2012/0110303 | A1 * | 5/2012 | Dhanwada | G06F 9/52 712/29 |
| 2013/0103928 | A1 * | 4/2013 | Allarey | G06F 1/206 712/30 |
| 2013/0145166 | A1 * | 6/2013 | Hsien | G06F 21/575 713/176 |
| 2013/0254117 | A1 * | 9/2013 | von Mueller | G06Q 20/3829 705/71 |
| 2013/0301529 | A1 * | 11/2013 | Lindsay | H04W 4/12 370/328 |
| 2014/0096270 | A1 * | 4/2014 | Beckwith | G06F 21/6209 726/30 |

* cited by examiner

*Primary Examiner* — Ghodrat Jamshidi
(74) *Attorney, Agent, or Firm* — Jefferson IP Law, LLP (57) ABSTRACT

An electronic device that may process a security packet is provided. The electronic device includes a first processor configured to transmit a security context and a second processor configured to process a packet to which security is applied using the security context.

20 Claims, 7 Drawing Sheets

APPARATUS AND METHOD FOR PROCESSING SECURITY PACKET IN ELECTRONIC DEVICE

CROSS-REFERENCE TO RELATED APPLICATION(S)

This application claims the benefit under 35 U.S.C. § 119(a) of a Korean patent application filed on Nov. 12, 2013 in the Korean Intellectual Property Office and assigned Serial number 10-2013-0137063, the entire disclosure of which is hereby incorporated by reference.

TECHNICAL FIELD

The present disclosure relates to an electronic device that may process a security packet.

BACKGROUND

Internet Protocol (IP) security is technology in which the IP, which is a network layer, provides security. The IP security includes protocols such as an Encapsulating Security Payload (ESP) that together supports an authentication header that allows authentication of a data transmitter and data encoding and authentication of a transmitter. The IP security provides a tunnel mode that provides a security tunnel between security gateways and a transport mode that provides a security tunnel between termination hosts.

The IP security may be applied to a Voice over Internet Protocol (VoIP) service. In this case, messages of a Session Initiation Protocol (SIP) for setting the VoIP call may be processed according to the IP security. Typically, when a commercialized Long Term Evolution (LTE) system provides the VoIP service, a terminal uses a plurality of TCP/IP stacks. Each TCP/IP stack may be controlled by different processors. In this case, when IP security is applied, a TCP/IP stack maintains and manages a context of the IP security. Accordingly, because another TCP/IP stack may not process an IP security packet, when transmitting a specific SIP message to which IP security is applied, a TCP/IP stack that manages the IP security context should be woken up. Even in a signaling procedure that may be processed by another TCP/IP stack, because the other TCP/IP stack does not have the IP security context, the other TCP/IP may not process the signaling procedure.

As described above, as a TCP/IP stack manages an IP security context, a message or a packet to which IP security is applied may be processed only by a corresponding TCP/IP stack. When a processor that controls the TCP/IP stack that manages the IP security context is always activated, problems are unlikely to occur. However, when the TCP/IP stack that manages the IP security context is in an idle state according to a predetermined condition, even if another TCP/IP stack is activated, the TCP/IP stack should finish an idle state.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for processing a security packet in an electronic device.

Another aspect of the present disclosure is to provide an apparatus and method for processing a security packet when a plurality of protocol stacks exist in an electronic device.

Another aspect of the present disclosure is to provide an apparatus and method for synchronizing a security context between a plurality of protocol stacks in an electronic device.

Another aspect of the present disclosure is to provide an apparatus and method for providing a security context from one processor to another processor in an electronic device.

Another aspect of the present disclosure is to provide an apparatus and method in which one processor acquires a security context managed by another processor in an electronic device.

In accordance with an aspect of the present disclosure, an electronic device is provided. The electronic device includes a first processor configured to transmit a security context and a second processor configured to process a packet to which security is applied based on the security context.

In accordance with another aspect of the present disclosure, a method of operating an electronic device is provided. The method includes transferring a security context managed by a first processor to a second processor and processing a packet to which security is applied through the second processor based on the security context.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, in the present disclosure, technology for synchronizing a security context between a plurality of processors that control the same protocol in an electronic device is described. Terms used in the following description are used for convenience of description. The present disclosure is not limited to terms to be described later and other terms indicating an element having an equivalent technical meaning may be used.

An electronic device according to various embodiments of the present disclosure includes a plurality of processors, and the plurality of processors control the same protocol stack. In this case, one of the processors manages a security context. According to an embodiment of the present disclosure, in order to enable another processor thereof to process a security packet, the processors share and synchronize the security context. For example, the plurality of processors may include an Application Processor (AP) 110 and a Communication Processor (CP) 120, as shown in FIG. 1.

Figure 1:
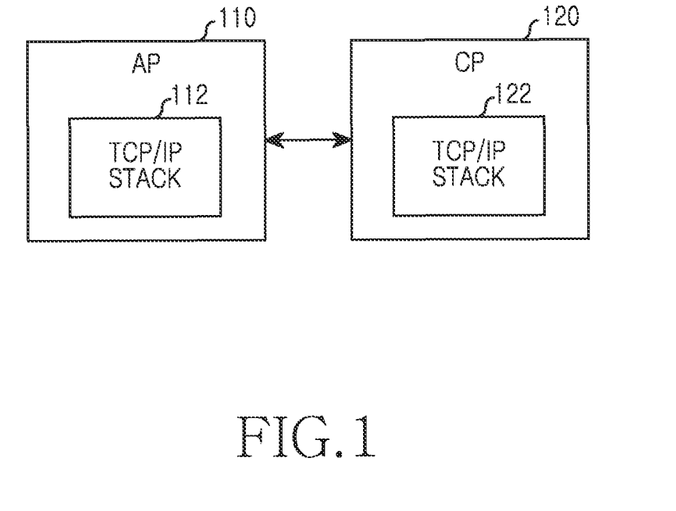
FIG. 1 is a diagram illustrating an example of processors within an electronic device according to an embodiment of the present disclosure.

FIG. 1 is a diagram illustrating an example of processors within an electronic device according to an embodiment of the present disclosure.

Referring to FIG. 1, the electronic device includes the AP 110 and the CP 120. The AP 110 controls applications executed in the electronic device. The CP 120 performs operation and control necessary for performing communication. According to an embodiment of the present disclosure, the CP 120 may include modules for processing a base band transmitting signal and a base band receiving signal.

The AP 110 includes a Transmission Control Protocol/Internet Protocol (TCP/IP) stack 112, and the CP 120 includes a TCP/IP stack 122. In order to perform operation and control for interacting with applications, the AP 110 may include a TCP/IP stack 112, and in order to process Real-time Transport Protocol (RTP) packets, the CP 120 may include the TCP/IP stack 122. The TCP/IP stack 112 belonging to the AP 110 may be referred to as a main TCP/IP stack, and the TCP/IP stack 112 belonging to the CP 120 may be referred to as a sub-TCP/IP stack.

The AP 110 may process a packet transmitted and received according to an IP security technique applied to an IP layer. In other words, the AP 110 maintains and manages a security context. The AP 110 and the CP 120 synchronize a security context between two TCP/IP stacks 112 and 122.

According to an embodiment of the present disclosure, the synchronization procedure may be performed in an entire situation to which security is applied. According to another embodiment of the present disclosure, the synchronization procedure may be performed in one of several previously defined situations. For example, the synchronization procedure may be performed for a VoIP call in which the two TCP/IP stacks 112 and 122 use for transmitting Session Initiation Protocol (SIP) packets to a network for a call.

While the synchronization procedure is performed in the SIP procedure, an SIP stack included in the AP 110 or the CP 120 may notify the TCP/IP stack 112 within the AP 110 that an SIP related message should be transmitted or received. Accordingly, the TCP/IP stack 112 may determine one of the TCP/IP stacks 112 and 122 as an object to process the SIP related message based on a kind of a performing call. The AP 110 including the TCP/IP stack 112 may select one of the TCP/IP stacks 112 and 122 based on a call context. In this case, when the TCP/IP stack 122 of the CP 120 is selected, a synchronization procedure of the security context may be performed.

For synchronization of the security context, the security context should be transferred between processors of the electronic device. For example, for communication between the processors, Inter-Process Communication (IPC) technique operating within the device may be used. The security context may be synchronized between the AP 110 and the CP 120 by information exchange according to the IPC technique.

Figure 2:
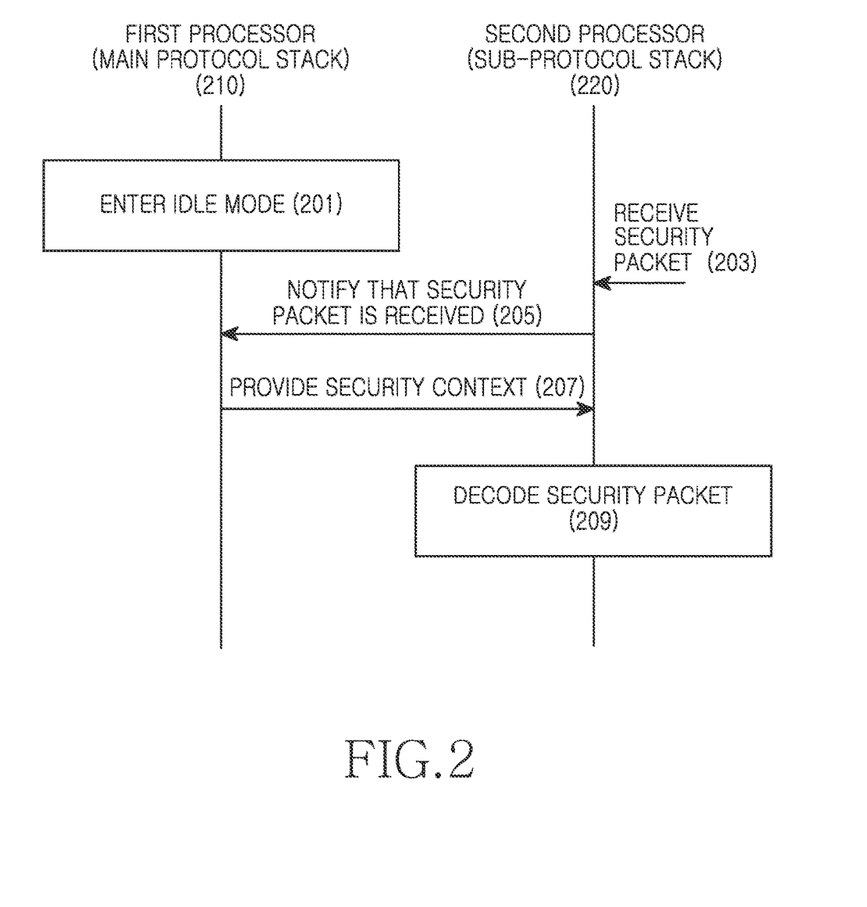
FIG. 2 is a flowchart illustrating signal exchange between processors of an electronic device according to an embodiment of the present disclosure.

FIG. 2 is a flowchart illustrating signal exchange between processors of an electronic device according to an embodiment of the present disclosure.

Referring to FIG. 2, a first processor 210 controls a main protocol stack, and a second processor 220 controls a sub-protocol stack. The first processor 210 maintains and manages a security context. For example, the first processor 210 may be an AP, and the second processor 220 may be a CP.

The first processor 210 enters an idle mode in operation 201. Although not shown in FIG. 2, the first processor 210 may acquire an IP address from a network using the main TCP/IP stack. Thereafter, the first processor 210 may be operated in the idle mode according to a previously defined condition. For example, the previously defined condition may include that operation to process does not exist for a predetermined time or more.

The second processor 220 receives a security packet from a network in operation 203. The security packet receives application of security algorithm. For example, when IP security is applied, the security packet may include an ESP that together supports an authentication header and data encoding and authentication of a transmitter. For example, the authentication header may include at least one of a next header instructing a type of a next header, a length instructing a length of the authentication header, an Security Parameter Index (SPI) including a random value used for identifying security connection, an SN increasing whenever transmitting a packet, and an Integrity Check Value (ICV), which is a value of suppressing a length from varying. The ESP may also include at least one of an SPI including a random value used for identifying security connection, an SN increasing whenever transmitting a packet, payload data, padding, a padding length instructing a length of the padding, a next header instructing a type of a next header, and an ICV, which is a value of suppressing a length from varying.

The second processor 220 notifies the first processor 210 that the security packet is received in operation 205. Because the security context is managed by the first processor 210, the second processor 220 does not have a security context. As a result, the second processor 220 cannot process the security packet. For example, the security packet may be a message according to an SIP, and may include an SIP update message. In this case, reception of the SIP update message may be notified to the first processor 210 by an SIP stack within the second processor 220.

The first processor 210 provides a security context to the second processor 220 in operation 207. The security context is information necessary for decoding the security packet. A detailed parameter of the provided security context may be defined in a range necessary for decoding the security packet. A detailed parameter of a synchronized security context may be defined differently according to various embodiments of the present disclosure. For example, the security context may include at least one of at least one parameter included in the SN and the ESP and at least one parameter included in an authentication header. In order to provide the security context, the first processor 210 may use IPC technique. In this case, the first processor 210 generates an IPC message including parameters that define a security context and transfers the IPC message to the second processor 220.

The second processor 220 decodes the security packet using the security context in operation 209. Thereafter, although not shown in FIG. 2, the second processor 220 may transmit a response to a message included in a received security packet. In this case, the second processor 220 may generate a security packet including the response using the security context.

The first processor 210 and the second processor 220 are synchronized through the above-described procedure, and a procedure by the security packet may be processed by the second processor 220. The first processor 210 may process the security packet without exiting the idle mode. For example, when the security packet received in operation 203 includes an SIP update message for an SIP update procedure, the SIP update procedure may be performed through a TCP/IP stack of the second processor 220 for a VoIP call.

Figure 3:
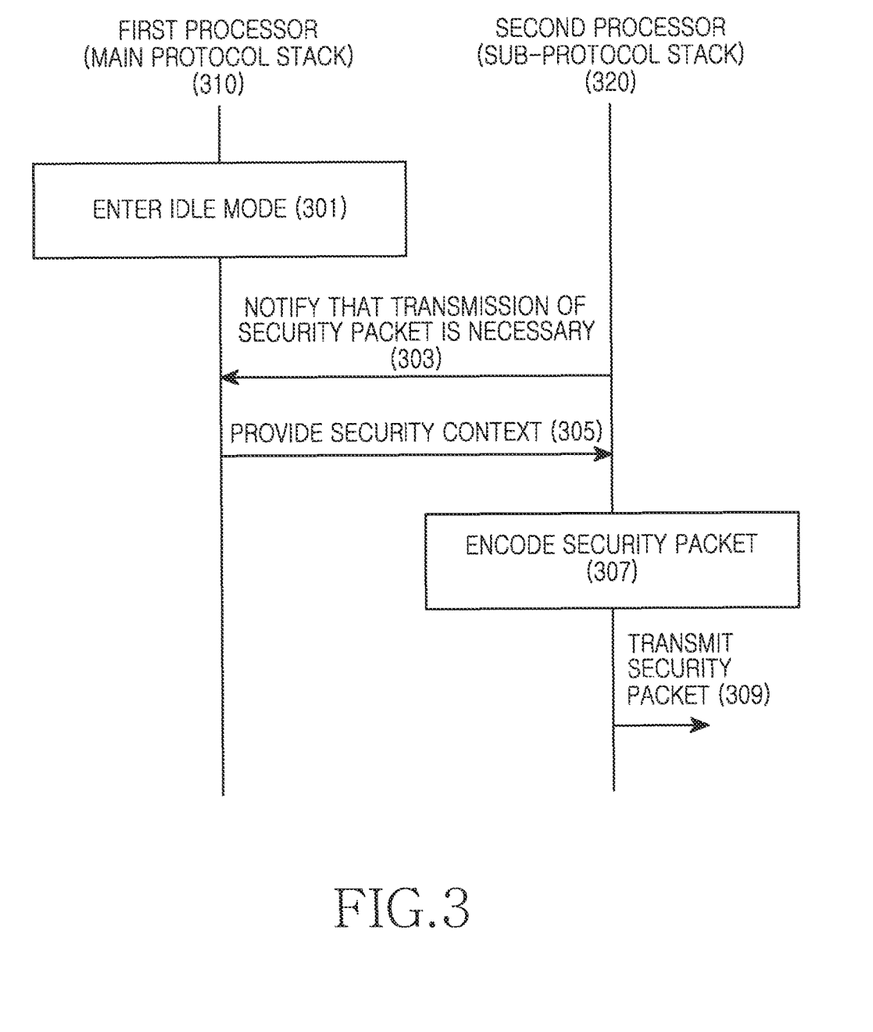
FIG. 3 is a flowchart illustrating signal exchange between processors of an electronic device according to an embodiment of the present disclosure.

FIG. 3 is a flowchart illustrating signal exchange between processors of an electronic device according to another embodiment of the present disclosure.

Referring to FIG. 3, a first processor 310 controls a main protocol stack, and a second processor 320 controls a sub-protocol stack. The first processor 310 maintains and manages a security context. For example, the first processor 310 may be an AP, and the second processor 320 may be a CP.

The first processor 310 enters an idle mode in operation 301. Although not shown in FIG. 3, the first processor 310 may acquire an IP address from a network using the main TCP/IP stack. Thereafter, the first processor 310 may operate in the idle mode according to a previously defined condition. For example, the previously defined condition may include that operation to process for a predetermined time does not exist.

The second processor 320 determines that transmission of a security packet is necessary and notifies the first processor 310 that transmission of the security packet is necessary in operation 303. The security packet receives application of security algorithm. For example, the second processor 320 may determine whether security is applied to a protocol that controls a message or data to transmit, thereby determining whether transmission of the security packet is necessary. The security packet may be a message according to an SIP. In this case, the second processor 320 may notify the first processor 310 that transmission of the SIP related message is necessary by an SIP stack within the second processor 320. For example, when IP security is applied, the security packet may include an authentication header and an ESP. The authentication header may include at least one of a next header instructing a type of a next header, a length instructing a length of the authentication header, an SPI including a random value used for identifying security connection, an SN increasing whenever transmitting a packet, and an ICV, which is a value of suppressing a length from varying. The ESP may include at least one of an SPI including a random value used for identifying security connection, an SN increasing whenever transmitting a packet, payload data, padding, a padding length instructing a length of the padding, a next header instructing a type of a next header, and an ICV, which is a value of suppressing a length from varying.

The first processor 310 provides a security context to the second processor 320 in operation 305. The security context is information necessary for encoding the security packet. A specific parameter of the provided security context may be defined in a range necessary for encoding the security packet. A detailed parameter of a synchronized security context may be defined differently according to embodiments of the present disclosure. For example, the security context may include at least one of at least one parameter included in the SN and the ESP and at least one parameter included in an authentication header. In order to provide the security context, the first processor 310 may use IPC technique. The first processor 310 may generate an IPC message including parameters that define the security context and transfer the IPC message to the second processor 320.

The second processor 320 encodes the security packet using the security context in operation 307. The second processor 320 transmits the security packet to a network in operation 309.

The first processor 310 and the second processor 320 are synchronized through the above-described procedure, and a procedure by the security packet may be processed by the second processor 320. The first processor 310 may process the security packet without waking up from the idle mode. For example, when the security packet transmitted in operation 309 includes a message for an SIP update procedure, the SIP update procedure may be performed through a TCP/IP stack of the second processor 320 for a VoIP call.

Figure 4:
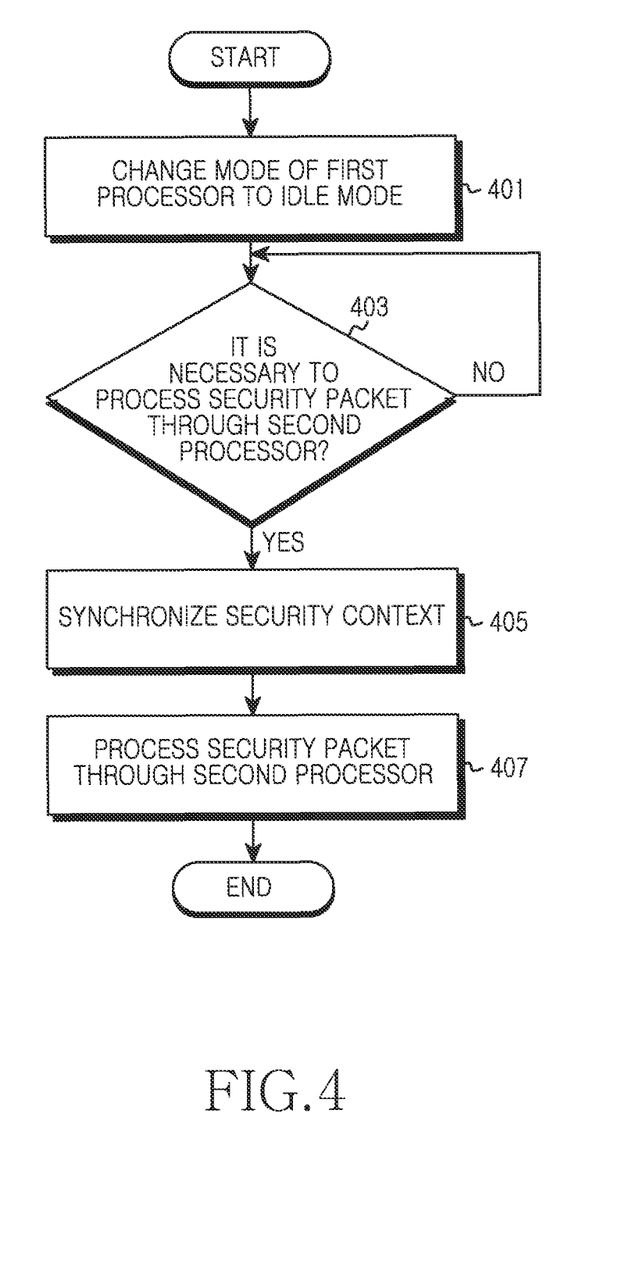
FIG. 4 is a flowchart illustrating an operation procedure of an electronic device according to an embodiment of the present disclosure.

FIG. 4 is a flowchart illustrating an operation procedure of an electronic device according to an embodiment of the present disclosure.

Referring to FIG. 4, in operation 401, the electronic device changes a mode of the first processor to an idle mode. For example, the first processor may be an AP. The first processor controls a main protocol stack and maintains and manages a security context for security in a corresponding protocol. The security may include IP security.

Thereafter, in operation 403, the electronic device determines whether it is necessary to process a security packet through the second processor. For example, while the first processor is in the idle mode, when a security packet is received from a network or when it is necessary to transmit a security packet to a network, the electronic device may determine that it is necessary to process a security packet through the second processor. For example, the security packet may include an SIP related message.

If it is necessary to process a security packet through the security packet, then in operation 403, the electronic device may synchronize the security context. The electronic device provides a security context stored at the first processor to the second processor. For example, the electronic device may generate a signal that requests the security context with the first processor. The IPC message may be transferred from the first processor to the second processor. For example, the IPC message may include the security context, and a security context included in the IPC message may include at least one of at least one parameter included in an SN and an ESP and at least one parameter included in an authentication header.

In operation 407, the electronic device processes the security packet through the second processor. The electronic device encodes or decodes the security packet within the second processor using the synchronized security context. The electronic device processes the security packet using the second processor without waking up from an idle mode of the first processor.

According to an embodiment of the present disclosure, the procedure shown in FIG. 4 may be performed only under a predetermined condition. For example, security context synchronization shown in FIG. 4 may be performed while the electronic device performs a VoIP service.

Figure 5:
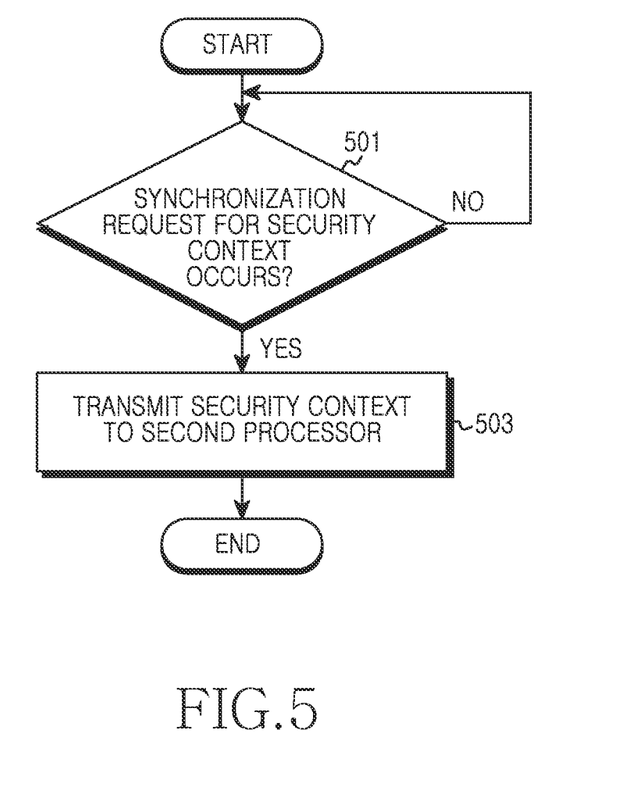
FIG. 5 is a flowchart illustrating an operation procedure of a first processor of an electronic device according to an embodiment of the present disclosure.

FIG. 5 is a flowchart illustrating an operation procedure of a first processor of an electronic device according to an embodiment of the present disclosure.

Referring to FIG. 5, in operation 501, the first processor determines whether a synchronization request for a security context occurs. For example, when the first processor is in an idle mode, a security packet is received to the second processor or when the second processor transmits a security packet, the synchronization request may occur. The synchronization request may occur by a protocol that controls the security packet. For example, when security technique is applied to an SIP message, the synchronization may be requested by an SIP stack.

If a synchronization request for a security context occurs, then in operation 503, the first processor transmits the security context to the second processor. The first processor provides the security context to the second processor. The first processor may transfer an IPC message to the second processor. For example, the IPC message includes the security context, and the security context included in the IPC message may include at least one of at least one parameter included in an SN and an ESP and at least one parameter included in an authentication header.

According to an embodiment of the present disclosure, a procedure shown in FIG. 5 may be performed only under a predetermined condition. For example, security context synchronization shown in FIG. 5 may be performed while the electronic device performs a VoIP service. Alternatively, when the first processor is in an idle mode, security context synchronization shown in FIG. 5 may be performed.

Figure 6:
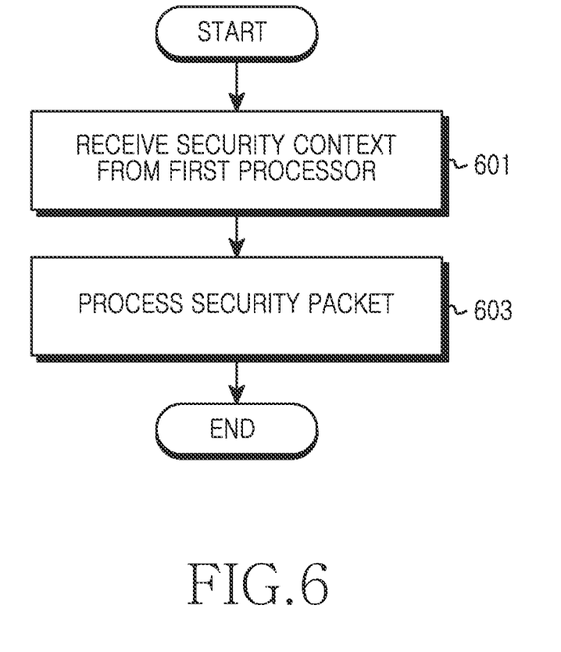
FIG. 6 is a flowchart illustrating an operation procedure of a second processor of an electronic device according to an embodiment of the present disclosure.

FIG. 6 is a flowchart illustrating an operation procedure of a second processor of an electronic device according to an embodiment of the present disclosure.

Referring to FIG. 6, in operation 601, the second processor receives a security context from the first processor. The first processor provides the security context to the second processor. The second processor may receive an IPC message from the first processor. For example, the IPC message may include the security context, and the security context included in the IPC message may include at least one of at least one parameter included in an SN and an ESP and at least one parameter included in an authentication header.

After receiving the security context, the second processor processes a security packet in operation 603. The second processor encodes or decodes the security packet using the security context received, i.e., synchronized from the first processor. For example, the security packet may include an SIP update message.

According to an embodiment of the present disclosure, a procedure shown in FIG. 6 may be performed only under a predetermined condition. For example, security context synchronization shown in FIG. 6 may be performed while the electronic device performs a VoIP service. Alternatively, when the first processor is in an idle mode, security context synchronization shown in FIG. 6 may be performed.

Figure 7:
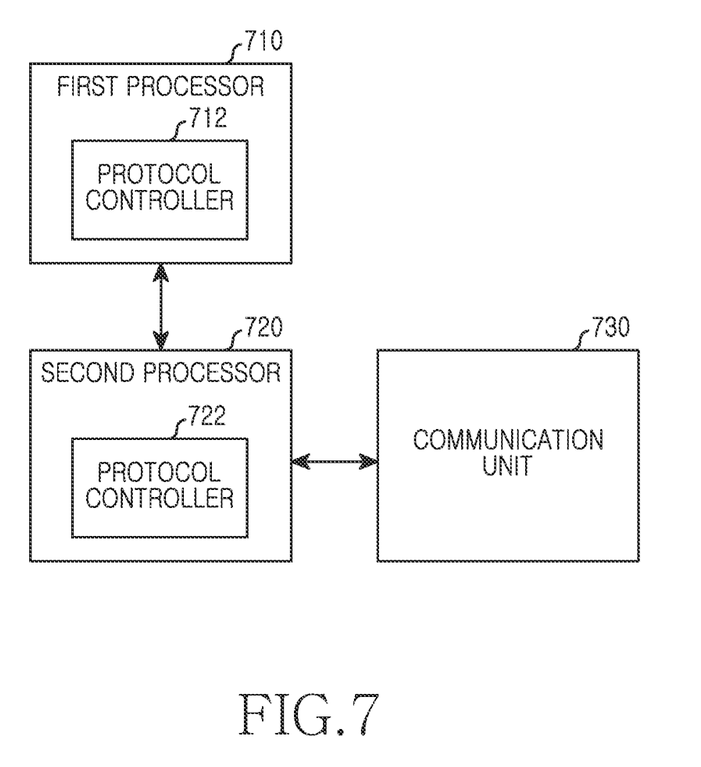
FIG. 7 is a block diagram illustrating a configuration of an electronic device according to an embodiment of the present disclosure.

FIG. 7 is a block diagram illustrating a configuration of an electronic device according to an embodiment of the present disclosure.

Referring to FIG. 7, the electronic device includes a first processor 710, a second processor 720, and a communication unit 730.

The first processor 710 controls applications executed in the electronic device. For example, the first processor 710 may be referred to as an AP. The first processor 710 may include a protocol controller 712 that interacts with applications. The protocol controller 712 may be formed with a Main Control Unit (MCU). For example, the protocol controller 712 may control a TCP/IP and an SIP. According to an embodiment of the present disclosure, the first processor 710 may acquire an IP address through the protocol controller 712 and perform a procedure necessary for applying IP security. For example, the first processor 710 may perform a procedure necessary for security processing of a network and a packet. The first processor 710 may perform a procedure for generating a security context. The first processor 710 may also maintain and manage the security context for IP security.

The second processor 720 may perform operation and control necessary for performing communication. For example, the second processor 720 may be a CP. The CP 720 may include a protocol controller 722 for processing RTP packets. The protocol controller 722 may be formed with an MCU. For example, the protocol controller 722 may control a TCP/IP and an SIP.

The communication unit 730 may perform a processing of a physical layer of a transmitting signal and a receiving signal for performing the communication. For example, the communication unit 730 may include at least one of a unit or device for processing a base band signal and a unit or device for processing a Radio Frequency (RF) signal. For example, the communication unit 730 may include at least one of a transmitting filter, a receiving filter, an amplifier, a mixer, an oscillator, a Digital-to-Analog Converter (DAC), and an Analog-to-Digital Converter (ADC). According to an embodiment of the present disclosure, the means for processing the base band signal may be included in the second processor 720.

According to an embodiment of the present disclosure, the first processor 710 and the second processor 720 may synchronize a security context. For example, the first processor 710 and the second processor 720 may perform the procedure of FIG. 4. The first processor 710 may perform the procedure of FIG. 5, and the second processor 720 may perform the procedure of FIG. 6. When processing a security packet through the second processor 720, the first processor 710 may provide the security context to the second processor 720. An IPC message may be transferred from the first processor 710 to the second processor 720. For example, the IPC message may include the security context, and for example, the security context included in the IPC message may include at least one of at least one parameter included in an SN and an ESP and at least one parameter included in an authentication header. Thereafter, the second processor 720 may process the security packet. The second processor 720 may encode or decode the security packet using the synchronized security context.

By synchronizing a security context between processors, even when the first processor is in an idle mode, the electronic device may process a security packet without waking up from the idle mode. Accordingly, power consumption may be reduced.

In the foregoing embodiments of the present disclosure, constituent elements included in the present disclosure were expressed in the singular or the plural according to a suggested embodiment. However, an expression of the singular or the plural is selected appropriate to a situation suggested for convenience of description, and the present disclosure is not limited to a single constituent element or a plurality of constituent elements, and constituent elements expressed with the plural may be formed in the singular or constituent elements expressed with the singular may be formed in the plural.

Various aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include Read-Only Memory (ROM), Random-Access Memory (RAM), CD-ROMs, magnetic tapes, floppy disks, and optical data storage devices. The non-transitory computer readable recording medium can also be distributed over network coupled computer systems so that the computer readable code is stored and executed in a distributed fashion. Also, functional programs, code, and code segments for accomplishing the present disclosure can be easily construed by programmers skilled in the art to which the present disclosure pertains.

At this point it should be noted that various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a first processor for managing security information for processing a security packet while performing a voice over internet protocol (VoIP) service, and configured to transmit, to a second processor, the security information comprising a security context for internet protocol security (IPsec) applied to the VoIP service, via an inter-process communication (IPC) message; and
   the second processor configured to decode the received security packet by using the security information transmitted from the first processor while the first processor is in an idle mode,
   wherein the security packet comprises a session initiation protocol (SIP) message for the VoIP service,
   wherein the first processor comprises an application processor (AP), and
   wherein the second processor comprises a communication processor (CP).

2. The electronic device of claim 1, further comprising a transceiver configured to receive the security packet.

3. The electronic device of claim 1, wherein the second processor, is further configured to:
   encode the security packet by using the security information, and
   transmit the encoded security packet using a transceiver.

4. The electronic device of claim 1, wherein the second processor is further configured to store the security information after receiving the security information from the first processor.

5. The electronic device of claim 1,
   wherein the first processor is further configured to generate the security context when the first processor is not in the idle mode, and
   wherein the second processor is in a state in which the security packet cannot be processed before receiving the security context from the first processor.

6. The electronic device of claim 1, wherein the second processor is further configured to perform an SIP update procedure by using the security packet when the security packet comprises an SIP update message for the SIP update procedure.

7. The electronic device of claim 6,
   wherein the security context is managed by a transmission control protocol/internet protocol (TCP/IP) stack controlled by each of the first processor and the second processor, and
   wherein the security packet is managed by a SIP protocol controlled by the second processor.

8. The electronic device of claim 1, wherein the first processor is, further configured to:
   determine the second processor for processing the security information based on a type of the VoIP service, and
   transmit, to the second processor, the security information.

9. The electronic device of claim 1, wherein the security packet is processed by the second processor without waking up the first processor from the idle mode.

10. The electronic device of claim 1, wherein the second processor is further configured to transmit a message for requesting the security information to the first processor.

11. A method for operating an electronic device comprising a first processor for managing security information for processing a security packet while performing a voice over internet protocol (VoIP) service and a second processor, the method comprising:

transmitting, from the first processor to the second processor, the security information comprising a security context for internet protocol security (IPsec) applied to the VoIP service, via an inter-process communication (IPC) message; and     decoding, by the second processor, the security packet by using the security information transmitted from the first processor to the second processor while the first processor is in an idle mode,     wherein the security packet comprises a session initiation protocol (SIP) message for the VoIP service,     wherein the first processor comprises an application processor (AP), and     wherein the second processor comprises a communication processor (CP).

12. The method of claim 11, further comprising receiving the security information.

13. The method of claim 11, further comprising:

encoding the security packet by using the security information; and     transmitting the encoded security packet.

14. The method of claim 11, further comprising storing the security information in the second processor after receiving the security information from the first processor.

15. The method of claim 11, further comprising generating the security context when the first processor is not in the idle mode,     wherein the second processor is in a state in which the security packet cannot be processed before receiving the security context from the first processor.

16. The method of claim 11, further comprising:

performing, by the second processor, an SIP update procedure by using the security packet when the security packet comprises an SIP update message for the SIP update procedure.

17. The method of claim 16, wherein the security context is managed by a transmission control protocol/internet protocol (TCP/IP) stack controlled by each of the first processor and the second processor, and     wherein the security packet is managed by a SIP protocol controlled by the second processor.

18. The method of claim 11, wherein the transmitting of the security information comprises:

determining, by the first processor, the second processor for processing the security information based on a type of the VoIP service; and     transmitting, by the first processor, the security information to the second processor.

19. The method of claim 11, wherein the security packet is processed by the second processor without waking up the first processor from the idle mode.

20. The method of claim 11, further comprising:

transmitting, by the second processor, a message for requesting the security information to the first processor.

* * * * *